United States Patent [19]

Heetderks

[11] 4,172,001

[45] Oct. 23, 1979

[54] SPLICED WEB ADAPTED FOR COATING WITH LIQUID COATING COMPOSITIONS

[75] Inventor: James P. Heetderks, Rochester, N.Y.

[73] Assignee: Eastman Kodak Company, Rochester, N.Y.

[21] Appl. No.: 922,879

[22] Filed: Jul. 7, 1978

[51] Int. Cl.[2] .................... B32B 7/12

[52] U.S. Cl. .................... 156/157; 156/280; 156/304; 427/13; 427/299; 428/61; 428/213; 428/156; 428/220

[58] Field of Search .................... 156/157, 280, 304, 278; 428/57, 58, 60, 61, 156, 220, 213; 427/13, 145, 299; 118/410; 96/114.7

[56] References Cited

U.S. PATENT DOCUMENTS

| | | | |
|---|---|---|---|
| 1,588,255 | 6/1926 | Maxwell | 428/58 |
| 3,518,141 | 6/1970 | Bourns et al. | 156/157 |
| 3,531,362 | 9/1970 | Bourns et al. | 156/157 |
| 3,533,833 | 10/1970 | Takahashi et al. | 118/410 |
| 3,916,043 | 10/1975 | Fowble | 118/410 |
| 3,972,762 | 8/1976 | Takagi et al. | 156/280 |
| 4,024,302 | 5/1977 | Takagi et al. | 156/157 |

FOREIGN PATENT DOCUMENTS 1243663 8/1971 United Kingdom .

*Primary Examiner*—Jerome W. Massie

*Attorney, Agent, or Firm*—A. P. Lorenzo

[57] ABSTRACT

In coating a liquid coating composition on a spliced web comprising contiguous web portions spliced together with a splicing tape, for example in the coating of gelatin emulsions or other hydrophilic colloid compositions on butt-spliced photographic support materials, coating disturbances caused by the splice are reduced by the use of a thin tape overlying the trailing edge of the splicing tape. The thin tape serves as a ramp between the splicing tape and the surface of the web and introduces only a very small vertical drop at its own trailing edge, to thereby permit coating of the spliced web with minimal disturbance of the coating operation.

30 Claims, 2 Drawing Figures

SPLICED WEB ADAPTED FOR COATING WITH LIQUID COATING COMPOSITIONS

BACKGROUND OF THE INVENTION

1. Field of the Invention

This invention relates in general to the art of coating and in particular to the application of liquid coating compositions to a spliced web. More specifically, this invention relates to an improved spliced web and to the utilization of such web in a coating process to achieve a reduction in coating disturbances caused by the splice during coating of the spliced web with a liquid composition.

2. Description of the Prior Art

A longstanding problem in the art of coating web materials with liquid coating compositions is disturbance of the coating operation that is caused by splices in the web. The problem is particularly acute in the photographic art in which it is very common to make use of the bead coating technique to coat a web of photographic support material with liquid photographic coating compositions, such as radiation-sensitive gelatin silver halide emulsions utilized to form imaging layers or other hydrophilic colloid compositions employed in subbing layers, inter-layers, antistatic layers, protective overcoats layers, and so forth. In the bead coating process, one or more liquid layers are fed into a coating bead which is maintained in bridging relationship between the surface of a moving web and a coating device which is closely spaced therefrom and the surface of the web is continuously moved across and in contact with the coating bead to pick up the one or more liquid layers. The coating bead utilized in this method of coating is very susceptible to disturbance by the splice, which is typically a butt-splice in which web portions in contiguous end-to-end relationship are joined together by a splicing tape. A face-side splice is generally utilized, that is, the splicing tape is on the surface of the web to which the coating composition is applied, since this generally results in less disturbance than a back-side splice.

Disturbance of the coating bead by splices causes serious defects in the coating. The problem occurs even at low or moderate coating speeds but becomes especially severe at high coating speeds. Among the difficulties commonly encountered are the tendency of the coating bead to break into distinct areas, causing regions of excessively heavy coating and regions of no coating on the support. A further serious problem is the trapping of air bubbles at the trailing edge of the splicing tape. (The terms "leading edge" and "trailing edge" of the splicing tape are used herein to distinguish the two edges in relation to the direction of travel of the web, with the "trailing edge" being the edge on the downstream side and the "leading edge" the edge on the upstream side). Trapped air bubbles cause problems in a number of ways. For example, they may become lodged in the coating bead or on the lip of the coating hopper and cause a longitudinal streak in the coating which can render worthless substantial quantities of the coated material. Where the coating operation involves coating at two or more stations in succession, bubbles introduced into the coating at one station can be sheared off at a subsequent station and thereby cause the formation of streaks. Moreover, bubbles in the coating can result in incomplete drying so that at the first instance where the coated layer comes into contact with a roller there is a tendency for coating composition to adhere to the roller, resulting in a coating defect referred to as "track-off."

The leading edge of the splicing tape is not ordinarily an important factor in causing coating disturbances. Such disturbances are primarily associated with the trailing edge. In particular, the trapping of air bubbles occurs at the trailing edge as the coating bead passes over the splicing tape and then returns to engagement with the web surface. A major consideration in regard to the extent to which bubbles will be trapped and the coating operation will be disturbed is the magnitude of the vertical drop at the trailing edge of the splicing tape, that is, the distance from the surface of the splicing tape to the adjacent web surface. In general, the greater the extent of this vertical drop the greater the degree of disturbance of the coating process.

There have been many efforts made in the past to alleviate the problems associated with coating over splices and to reduce the extent to which disturbance of the coating operation takes place. For example, a simple method for reducing coating disturbances caused by splices is described in U.S. Pat. No. 3,518,141 and British Pat. No. 1,243,663. In this method, the trailing edge of the splicing tape and the adjacent web surface is covered with a film of water prior to the coating operation and the coating composition is applied before the water dries. Certain other techniques for reducing coating disturbances at splices are described in U.S. Pat. No. 3,531,362. The techniques described involve coating the trailing edge of the splicing tape and the adjacent web surface with a hydrophobic material, feathering or beveling the trailing edge of the splicing tape, and filling in the transition from the tape to the web surface with a suitable filler material such as rubber cement. A reduction in coating disturbances caused by splices can also be provided, as described in U.S. Pat. No. 3,916,043, by control of the differential pressure which is maintained to stabilize a coating bead. Thus, the disturbances caused by splices are greatly decreased if the differential pressure is increased to an elevated level just before a splice enters the coating station, is maintained at this level during the time the splice is passing the coating station and for a short time thereafter, and is then reduced to the normal level. Yet another procedure for reducing coating disturbances caused by splices is that described in U.S. Pat. No. 3,972,762 in which a portion of the web is "preworked" so that the web surface immediately downstream of the trailing edge of the splicing tape is at least coplanar with the surface of the splicing tape.

SUMMARY OF THE INVENTION

In accordance with this invention, there is provided an improved spliced web which is adapted for continuous coating with liquid coating composition with reduced splice-induced disturbance of the coating operation. The improved spliced web comprises first and second web portions in contiguous end-to-end relationship, a splicing tape overlying the contiguous ends of the web portions which is bonded to each web portion so as to splice them together, and a thin tape overlying an edge of the splicing tape and bonding to both the surface of the splicing tape and the surface of the web portion adjacent such edge. The splicing tape is sufficiently thick to provide the strength to the spliced web that is necessary to permit the continuous coating thereof, while the thin tape is of lesser thickness than the splicing tape and is sufficiently thin to serve as a ramp or gradual incline between the splicing tape and the adjacent web portion. In view of the function of this tape to provide a ramp between the web surface and the splicing tape, it is hereinafter referred to as a "ramp tape."

In coating the spliced web, the direction of travel of the web is such that the ramp tape overlies the trailing edge of the splicing tape. Since the ramp tape provides a gradual descent at the trailing edge of the splicing tape, the tendency to trap air bubbles is greatly reduced and the gradual transition from one surface to another facilitates coating with minimal disturbances. The ramp tape can be made very much thinner than the thinnest tape that would have sufficient strength to serve as a splicing tape. Thus, the vertical drop at the trailing edge of the ramp tape can be very much less than the vertical drop at the trailing edge of the splicing tape and can, in fact, be so small as to have little or no adverse effect on the coating bead.

Utilization of a ramp tape in combination with a splicing tape is a simple, convenient and highly effective way of solving a difficult problem. As contrasted with the prior art technique of applying a hydrophobic material it has the advantage of greater effectiveness and elimination of the problem of contamination of the coated web or of coating equipment with such material. Unlike the prior art techniques of feathering the trailing edge of the splicing tape or filling in the transition from tape to web surface with rubber cement, both of which are extremely difficult to accomplish in practice, it has the virtue of great simplicity. Moreover, the method described herein is much more easily accomplished than the technique of pre-working the web surface adjacent the trailing edge of the splicing tape to raise it to a height as great or greater than the surface of the tape since there is a pronounced tendency for any such elevation in the web surface to be flattened out by the tension applied to the web in the coating operation. Use of a backside tape, as proposed in U.S. Pat. No. 3,972,762, can aid to some degree in alleviating the effects of web tension but this greatly complicates the splicing operation since it requires that tapes be accurately positioned on both sides of the web. Moreover, when the web is worked to elevate a portion of the face side this necessarily creates a discontinuity on the back side of the web which can subsequently create coating disturbances if the product is one that must be coated on both sides.

DESCRIPTION OF THE PREFERRED EMBODIMENTS

The present invention is especially useful in the coating of photographic materials and particularly in the utilization of the bead coating method in photographic manufacturing operations. Accordingly, it is described hereinafter with respect to the coating of such materials. However, the invention is broadly useful wherever a spliced web is to be coated with liquid coating composition by a coating method in which the splice can cause disturbances and, accordingly, it can be applied in the manufacture of a wide variety of coated materials.

The bead coating method can be used in applying a single layer of coating composition or it can be used in the simultaneous application of two or more layers. It has been described in considerable detail in the prior art, for example, in U.S. Pat. Nos. 2,681,294; 2,761,417; 2,761,418; 2,761,419 and 2,761,791. Spliced webs which have been modified to reduce coating disturbances by the use of a ramp tape, as described herein, can be advantageously employed in single layer or multiple layer bead coating operations carried out under a wide variety of conditions. They are particularly advantageous in high speed coating operations involving a web speed of at least 100 centimeters per second.

Figure 1:
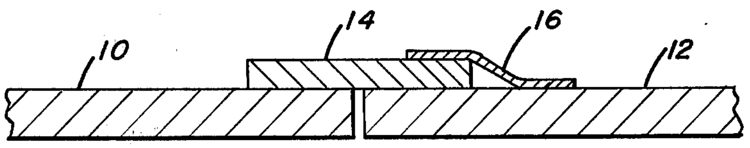
FIG. 1 is a greatly enlarged fragmentary section of a spliced web embodying the principles of this invention.

As illustrated in FIG. 1, web portions 10 and 12 are arranged in contiguous end-to-end relationship and splicing tape 14 is securely bonded to the surface of each web portion to form a splice. Splices of this type are very commonly utilized for the coating of photographic supports. Such splices are commonly referred to as butt-splices and the web portions are described as abutting even though they do not necessarily touch one another and ordinarily are positioned such that there is a narrow gap between them, for example, a gap of about one millimeter. Since it is desired to avoid having the web ends overlap one another and since there is great difficulty in cutting and positioning the web ends with such accuracy that they just touch over the full width of the web, the formation of a splice with a narrow gap between the web ends is ordinarily the most easy and convenient procedure. Since splicing tape 14 is wide in relation to the narrow gap, the fact that there is a gap between the web ends and that this gap may not be of exactly the same magnitude across the full width of the web creates no difficulties.

Figure 2:
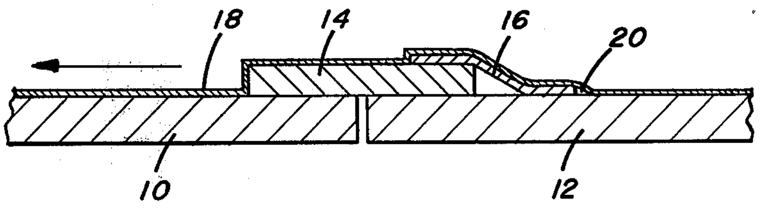
FIG. 2 is a greatly enlarged fragmentary section of the spliced web of FIG. 1 showing the intended direction of travel of the web for purposes of coating and showing a layer of coating composition coated over the spliced web.

Overlying one edge of splicing tape 14 and bonding to both the surface of splicing tape 14 and the surface of web portion 12 is ramp tape 16 which serves to provide a gradual incline from one surface to the other and thereby reduce coating disturbances. As shown in FIG. 2, for purposes of coating, the spliced web is advanced in the direction indicated by the arrow such that ramp tape 16 overlies the trailing edge of splicing tape 14. A layer 18 of a coating composition, such as a photographic gelatin emulsion, is shown overlying the spliced web. The coated layer closely follows the contour of the support at the leading edge of the splicing tape and at the leading edge of the ramp tape. At the trailing edge of the ramp tape a wedge of air 20 tends to form. However, in view of the thinness of ramp tape 16, air wedge 20 is so extremely small as to cause little or no disturbance of the coating operation. Thus, by use of ramp tape 16 it is possible to use a splicing tape 14 of considerable thickness that will provide a very strong splice and yet reduce the disturbance of the coating bead and the trapping of air bubbles to a very low level.

The improved spliced web of this invention can be composed of any material suitable for coating in web form. For example, the web can be composed of any photographic support material. Suitable supports include paper; baryta-coated paper; paper coated with polyolefins, as exemplified by polyethylene and polypropylene, or with other polymers, such as cellulose organic acid esters and polyesters; film base materials, such as cellulose nitrate film, cellulose acetate film, polyvinyl acetal film, polycarbonate film, polystyrene film, polyethylene terephthalate film, and the like.

The splicing tape used in the improved spliced web of this invention can be of any thickness which is sufficient to provide the strength to the spliced web that is necessary to permit continuous coating thereof. A preferred range of thickness for splicing tape used in splicing photographic supports which are to be bead coated is from about 25 to about 250 microns and more preferably from about 50 to about 100 microns. These thicknesses refer to the tape support plus the adhesive layer on the tape support, that is, they are the combined thickness of support material and adhesive. The optimum thickness will depend upon numerous factors such as the type of web material, the thickness of the web material, the type of coating hopper, and the speed of coating. The splicing tape can be made of any suitable material such as paper, cellulose acetate, polyethylene terephthalate or other polyester, and the like. A typical example of a useful splicing tape is one composed of 25-micron thick polyethylene terephthalate coated with a 25-micron thick layer of adhesive.

The ramp tape used in the improved spliced web of this invention is of lesser thickness than the splicing tape so that it can provide a ramp or incline between the splicing tape and the web portion adjacent to the trailing edge of the splicing tape. The thinner the ramp tape the greater is its effectiveness in providing a gradual descent from splicing tape surface to web surface with only a very small vertical drop at its own trailing edge. Preferably, the ramp tape has a thickness which is less than 60 percent of the thickness of the splicing tape with which it is used and more preferably a thickness which is less than 40 percent of the thickness of the splicing tape. These percentages refer to the combined thickness of the ramp tape support and its adhesive layer as compared to the combined thickness of the splicing tape support and its adhesive layer. While it is desirable that the ramp tape be as thin as possible, considerable difficulty may be encountered in handling and applying the tape if it is extremely thin. Thus, the thickness of the ramp tape will typically be a compromise between the need for sufficient thickness to facilitate handling and the need for sufficient thinness to be effective in reducing coating disturbances. The optimum thickness of the ramp tape will depend upon numerous factors such as the type of material from which it is formed, the type of material from which the web and splicing tape are formed, the thickness of the splicing tape, the type of coating hopper, and the speed of coating. The ramp tape can be made of the same kinds of materials as the splicing tape, for example, paper, cellulose acetate, polyethylene terephthalate, and the like.

A particularly useful combination within the scope of this invention is a ramp tape with a thickness in the range of 15 to 30 microns utilized in combination with a splicing tape with a thickness in the range of 50 to 75 microns. A typical example of a particularly useful combination of tapes is a splicing tape composed of 25-micron thick polyethylene terephthalate with a 25-micron thick layer of adhesive and a ramp tape composed of 10-micron thick polyethylene terephthalate with a 10-micron thick layer of adhesive.

The improved spliced web described herein includes a ramp tape and thereby results in substantially less coating disturbance than would take place in using the same splicing tape without the ramp tape under the same coating conditions. For many coating operations, the use of the ramp tape is sufficient to enable coating to take place with an acceptably low level of disturbances. However, for coating systems which are particularly susceptible to the introduction of coating disturbances caused by splices, and for coating at very high speeds, it is often advantageous to utilize the improved spliced web of this invention in combination with one or more of the techniques known in the prior art to be useful for alleviating splice disturbances. For example, the spliced web utilizing a ramp tape can also make use of a hydrophobic coating as described in U.S. Pat. No. 3,531,362. The oily hydrophobic material would be applied in a region encompassing the trailing edge of the ramp tape, that is a region covering part of the surface of the ramp tape and extending over part of the adjacent web surface. If coating speed is to be particulary high it may be advantageous to also coat the leading edge of the ramp tape and the leading edge of the splicing tape with the oily hydrophobic material. As described in U.S. Pat. No. 3,531,362, useful hydrophobic materials include marking inks comprised of a volatile carrier and a pigment, solutions of oil in a ketone, and a high flash naphtha fraction containing an oily material. A ramp tape can also be employed in combination with other techniques for reducing the disturbances caused by splices, for example in combination with the technique of regulating differential pressure, as described in U.S. Pat. No. 3,916,043, or in combination with the technique of imparting a suitable level of electrostatic polar charge to the splice area. Use of an electrostatic polar charge to promote uniform coating is well known and is described, for example, in U.S. Pat. Nos. 2,952,559 and 3,206,323. Use of two or more prior art techniques in combination with a ramp tape can also be advantageous in obtaining optimum results in particularly difficult coating operations. For example, the splice formed with splicing tape and ramp tape can be both provided with an electrostatic polar charge and treated with an oily material.

Coating compositions utilized in coating the novel spliced web described herein can be aqueous compositions or compositions in which the liquid medium is organic or a mixed aqueous-organic system. The coating compositions can take the form of solutions, dispersions or suspensions.

The invention is particularly advantageous in photographic manufacturing operations. It is suitable for use with any liquid photographic coating composition whether applied as a single layer or as part of a multilayer arrangement which is coated by techniques of simultaneous multi-layer coating and all such compositions as are utilized in the photographic art are intended to be within the term "photographic coating composition" as used herein.

The combination of a ramp tape with a splice tape which is described herein can be utilized on one or both sides of a web. Thus, where the web is one which is to be coated on both sides, a splice tape can be applied along both the face side and back side and a ramp tape can be applied over each splice tape at the appropriate edge so that it will overlie the trailing edge of the splice tape during the coating operation. In an alternative embodiment, the combination of a ramp tape with a splice tape can be used on one side of the web while only a splice tape is used on the opposite side.

The improved spliced web of this invention can be advantageously utilized in coating operations carried out at low, intermediate or high speeds. It is particularly useful in high speed bead coating operations used in the manufacture of photographic materials. In such processes the web speed employed is at least 100 centimeters per second and may be substantially greater than this, such as web speeds of up to 600 centimeters per second and higher. A preferred range of web speeds for high speed coating is from about 150 to about 500 centimeters per second.

Photographic layers applied with the use of this invention can be radiation-sensitive layers, such as gelatin silver halide emulsion layers, or non-radiation-sensitive layers. For example, subbing layers, pelloid protective layers, filter layers, antihalation layers, etc. are often applied separately and/or in combination and these particular layers are not radiation sensitive. The present invention relates also to the application of such layers, and the term "photographic coating composition" as employed herein, is intended to include the compositions from which such layers are formed. Moreover, the invention includes within its scope all radiation-sensitive materials, including electrophotographic materials and materials sensitive to invisible radiation as well as those sensitive to visible radiation. While, as mentioned hereinbefore, the layers are generally coated from aqueous media, the invention is not so limited since other liquid vehicles are known in the manufacture of photographic elements and the invention is also applicable to and useful in coating from such vehicles.

More specifically, the photographic layers coated according to the method of this invention can contain light-sensitive materials such as silver halides, zinc oxide, titanium dioxide, diazonium salts, light-sensitive dyes, etc. as well as other ingredients known to the art for use in photographic layers, for example, matting agents such as silica or polymeric particles, developing agents, mordants, and materials such as are disclosed in U.S. Pat. No. 3,297,446. The photographic layers can also contain various hydrophilic colloids. Illustrative of these colloids are proteins, e.g., gelatin; protein derivatives; cellulose derivatives; polysaccharides such as starch; sugars, e.g. dextran; plant gums; etc. synthetic polymers such as polyvinyl alcohol, polyacrylamide, and polyvinylpyrolidone; and other suitable hydrophilic colloids such as are disclosed in U.S. Pat. No. 3,297,446. Mixtures of the aforesaid colloids may be used, if desired.

The remarkable effectiveness of the spliced web of this invention in reducing coating disturbances is unexpected and surprising. Since the ramp tape partially overlaps the splicing tape it represents an increase in the overall elevation of the discontinuity at the splice and this might have been expected to increase the extent of disturbance of the coating operation. However, it has been found that it is the extent of the vertical drop at the trailing edge of the splicing tape that is, by far, the most significant factor in causing coating disturbances. Since the ramp tape avoids an abrupt vertical drop at the trailing edge of the splicing tape by providing a gradual incline, it is the vertical drop at the trailing edge of the ramp tape itself that becomes the significant factor. However, since the ramp tape does not have to be strong enough to join web ends together, it can be so thin that the vertical drop at its own trailing edge is very small indeed. Accordingly, by providing a very small vertical drop, disturbance of the coating operation caused by the splice is reduced to a minimum.

The invention is further illustrated by the following examples of its practice.

EXAMPLE 1

A multiple-slide hopper of the type described in U.S. Pat. No. 2,761,791 was used to simultaneously coat two layers of liquid coating composition on a moving web by a bead coating process. The coating bead was stabilized by a vacuum maintained at a level of 18 millimeters of water. Coating was carried out at a temperature of 40° C. The lower layer was formed from an aqueous gelatin silver halide photographic emulsion having a viscosity of 12.5 centipoises at 40° C. coated at a wet coverage of 56.8 cubic centimeters per square meter of web surface. The upper layer was formed from an aqueous gelatin silver halide photographic emulsion having a viscosity of 24.0 centipoises at 40° C. coated at a wet coverage of 7.75 cubic centimeters per square meter of web surface. In one instance the web was composed of polyethylene terephthalate film with a thickness of 178 microns butt-spliced with a splicing tape of polyethylene terephthalate having a combined thickness of the tape support and adhesive layer of 63.5 microns. In a second instance the web was composed of the same butt-spliced polyethylene terephthalate film but overlying the trailing edge of the splicing tape there was a ramp tape of polyethylene terephthalate having a combined thickness of the tape support and adhesive layer of 25.4 microns. The coating operation was carried out at a web speed of 254 centimeters per second and it was observed that there was much less disturbance caused by the splice and far fewer bubbles trapped at the splice in the case where a ramp tape was employed.

In additional evaluations of the invention, the coating operation was carried out at speeds of greater than 254 centimeters per second and in each instance it was found that the splice utilizing a ramp tape caused much less disturbance and trapped far fewer bubbles. Coatings were also made under the same conditions utilizing the ramp tape in combination with:

(a) a coating of oily material along the trailing edge of the ramp tape, (b) a 500-volt electrostatic polar charge over the splice area, and (c) a coating of oily material along the trailing edge of the ramp tape plus a 500-volt electrostatic polar charge over the splice area.

In each of (a), (b), and (c), improved results were obtained as compared to use of the ramp tape alone with the optimum results being obtained in (c).

EXAMPLE 2

The procedure of Example 1 was repeated except that the ramp tape was a polyethylene terephthalate tape having a combined thickness of the tape support and adhesive layer of 19 microns. Improved results in comparison with those of Example 1 were obtained because of the use of the thinner ramp tape.

The invention has been described in detail with particular reference to preferred embodiments thereof, but it will be understood that variations and modifications can be effected within the spirit and scope of the invention.

I claim:

1. A spliced web which is adapted for continuous coating with liquid coating composition with reduced splice-induced disturbance of the coating operation, said spliced web comprising first and second web portions in contiguous end-to-end relationship, a splicing tape overlying the contiguous ends of said first and second web portions and bonding to each of said first and second web portions so as to splice them together, said splicing tape being sufficiently thick to provide the strength to said spliced web that is necessary to permit the continuous coating thereof, and a ramp tape overlaying an edge of said splicing tape and bonding to both the surface of said splicing tape and the surface of the web portion adjacent said edge, said ramp tape being of lesser thickness than said splicing tape and being sufficiently thin to serve as a ramp between said splicing tape and said adjacent web portion to thereby facilitate coating of said spliced web with reduced splice-induced disturbance.

2. A spliced web as claimed in claim 1 wherein said splicing tape has a thickness in the range from about 25 to about 250 microns.

3. A spliced web as claimed in claim 1 wherein said splicing tape has a thickness in the range from about 50 to about 100 microns.

4. A spliced web as claimed in claim 1 wherein said ramp tape has a thickness which is less than 60 percent of the thickness of said splicing tape.

5. A spliced web as claimed in claim 1 wherein said ramp tape has a thickness which is less than 40 percent of the thickness of said splicing tape.

6. A spliced web as claimed in claim 1 wherein said splicing tape has a thickness in the range of 50 to 75 microns and said ramp tape has a thickness in the range of 15 to 30 microns.

7. A method of forming a splice in a web which is adapted to provide a spliced web that is capable of being continuously coated with a liquid coating composition with reduced splice-induced disturbance of the coating operation, said method comprising the steps of:

positioning first and second web portions in contiguous end-to-end relationship;

applying a splicing tape overlying the contiguous ends of said first and second web portions to bond said splicing tape to each of said first and second web portions so as to splice them together, said splicing tape being sufficiently thick to provide the strength to said spliced web that is necessary to permit the continuous coating thereof; and applying a ramp tape overlying an edge of said splicing tape to bond to both the surface of said splicing tape and the surface of the web portion adjacent said edge, said ramp tape being of lesser thickness than said splicing tape and being sufficiently thin to serve as a ramp between said splicing tape and said adjacent web portion.

8. A method as claimed in claim 7 wherein said splicing tape has a thickness in the range from about 25 to about 250 microns.

9. A method as claimed in claim 7 wherein said splicing tape has a thickness in the range from about 50 to about 100 microns.

10. A method as claimed in claim 7 wherein said ramp tape has a thickness which is less than 60 percent of the thickness of said splicing tape.

11. A method as claimed in claim 7 wherein said ramp tape has a thickness which is less than 40 percent of the thickness of said splicing tape.

12. A method as claimed in claim 7 wherein said splicing tape has a thickness in the range of 50 to 75 microns and said ramp tape has a thickness in the range of 15 to 30 microns.

13. In a continuous coating method wherein at least one layer of a liquid coating composition is applied to the surface of a moving web comprised of at least two web portions spliced together with a splicing tape, the improvement for reducing the extent to which the splicing tape contributes to the formation of defects in such coated layer which comprises applying a ramp tape over the trailing edge of said splicing tape prior to the coating of said web and bonding said ramp tape to both the surface of said splicing tape and the surface of said web adjacent said trailing edge, said ramp tape being of lesser thickness than said splicing tape and sufficiently thin to serve as a ramp between said splicing tape and said adjacent surface.

14. A coating method as claimed in claim 13 wherein said splicing tape has a thickness in the range from about 25 to about 250 microns.

15. A coating method as claimed in claim 13 wherein said splicing tape has a thickness in the range from about 50 to about 100 microns.

16. A coating method as claimed in claim 13 wherein said ramp tape has a thickness which is less than 60 percent of the thickness of said splicing tape.

17. A coating method as claimed in claim 13 wherein said ramp tape has a thickness which is less than 40 percent of the thickness of said splicing tape.

18. A coating method as claimed in claim 13 wherein said splicing tape has a thickness in the range of 50 to 75 microns and said ramp tape has a thickness in the range of 15 to 30 microns.

19. In a method for coating a photographic material in which one or more layers of liquid photographic coating composition are applied to a web by feeding such composition into a coating bead which is maintained in bridging relationship between the surface of said web and a coating device spaced therefrom and continuously moving the surface of said web across and in contact with said coating bead to pick up said one or more layers, said web comprising at least two web portions spliced together with a splicing tape, the improvement for reducing the extent to which said splicing tape disrupts said coating bead which comprises applying a ramp tape over the trailing edge of said splicing tape prior to the coating of said web and bonding said ramp tape to both the surface of said splicing tape and the surface of said web adjacent said trailing edge, said ramp tape being of lesser thickness than said splicing tape and sufficiently thin to serve as a ramp between said splicing tape and said adjacent surface.

20. A coating method as claimed in claim 19 wherein said splicing tape has a thickness in the range from about 25 to about 250 microns.

21. A coating method as claimed in claim 19 wherein said splicing tape has a thickness in the range from about 50 to about 100 microns.

22. A coating method as claimed in claim 19 wherein said ramp tape has a thickness which is less than 60 percent of the thickness of said splicing tape.

23. A coating method as claimed in claim 19 wherein said ramp tape has a thickness which is less than 40 percent of the thickness of said splicing tape.

24. A coating method as claimed in claim 19 wherein said splicing tape has a thickness in the range of 50 to 75 microns and said ramp tape has a thickness in the range of 15 to 30 microns.

25. A coating method as claimed in claim 19 wherein said coating composition is an aqueous hydrophilic colloid composition.

26. A coating method as claimed in claim 19 wherein said coating composition is a gelatin silver halide photographic emulsion.

27. A coating method as claimed in claim 19 comprising the additional step of applying a hydrophobic material in a region encompassing the trailing edge of said ramp tape.

28. A coating method as claimed in claim 19 comprising the additional step of applying an electrostatic polar charge to the surface of said spliced web in the region of the splice.

29. A coating method as claimed in claim 19 wherein coating is carried out at a web speed of at least 100 centimeters per second.

30. A coating method as claimed in claim 19 wherein coating is carried out at a web speed in the range of from about 150 to about 500 centimeters per second.

* * * * *